(12) United States Patent
Al-Yami et al.

(10) Patent No.: US 11,549,867 B2
(45) Date of Patent: Jan. 10, 2023

(54) SUBTERRANEAN ZONE FLUID SAMPLING TOOL

(71) Applicant: Saudi Arabian Oil Company, Dhahran (SA)

(72) Inventors: Fahad M. Al-Yami, Dhahran (SA); Mutaz S. Al-Ghamdi, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 329 days.

(21) Appl. No.: 16/270,474

(22) Filed: Feb. 7, 2019

(65) Prior Publication Data

US 2020/0256769 A1 Aug. 13, 2020

(51) Int. Cl.
  *G01N 1/14* (2006.01)
  *G01N 21/64* (2006.01)
  *G01N 27/06* (2006.01)

(52) U.S. Cl.
  CPC ............. *G01N 1/14* (2013.01); *G01N 21/645* (2013.01); *G01N 27/06* (2013.01)

(58) Field of Classification Search
  CPC ........... E21B 43/00; E21B 33/00; G01N 1/14; G01N 21/645; G01N 27/06
  See application file for complete search history.

(56) References Cited

U.S. PATENT DOCUMENTS

| | | |
|---|---|---|
| 2,609,878 A | 9/1952 | Halliburton |
| 2,781,663 A | 2/1957 | Maly et al. |
| 4,512,398 A | 4/1985 | Hazel |
| 4,766,955 A | 8/1988 | Petermann |
| 5,433,276 A * | 7/1995 | Martain ................ E21B 23/006 166/384 |
| 5,934,374 A | 8/1999 | Hrametz et al. |

(Continued)

FOREIGN PATENT DOCUMENTS

| | | |
|---|---|---|
| EP | 2163723 | 3/2010 |
| FR | 2742795 | 6/1997 |

(Continued)

OTHER PUBLICATIONS

International Search Report and Written Opinion issued in International Application No. PCT/US2020/016511 dated Apr. 9, 2020, 17 pages.

(Continued)

*Primary Examiner* — Feba Pothen
(74) *Attorney, Agent, or Firm* — Fish & Richardson P.C.

(57) ABSTRACT

A subterranean zone fluid sample tool includes an elongated tubular tool body configured to be disposed within a wellbore formed in a subterranean zone including multiple formations. The tool body includes multiple axial portions. The tool body has a length sufficient for a respective axial portion of the multiple axial portions to reside in each formation of the multiple formations. The tool includes multiple fluid sample probes configured to sample fluids in the multiple formations. The multiple fluid sample probes are radially offset from each other on a circumferential surface of the tool body. Each fluid sample probe is attached to a respective axial portion of the tool body that is configured to reside in a respective formation. The multiple fluid sample probes are configured to simultaneously sample fluids in the respective formation.

13 Claims, 7 Drawing Sheets

(56) References Cited

U.S. PATENT DOCUMENTS

| | | |
|---|---|---|
| 7,090,012 B2 | 8/2006 | Hill et al. |
| 7,805,988 B2 | 10/2010 | Kasperski et al. |
| 2008/0066535 A1 | 3/2008 | Vasques et al. |
| 2008/0115575 A1 | 5/2008 | Dale et al. |
| 2009/0183882 A1 | 7/2009 | Van Zuilekom et al. |
| 2010/0319912 A1 | 12/2010 | Pop et al. |
| 2013/0214934 A1* | 8/2013 | Smart .................. E21B 47/103 340/854.3 |
| 2014/0196532 A1 | 7/2014 | Bullock et al. |
| 2015/0176405 A1 | 6/2015 | Corre et al. |
| 2016/0123143 A1 | 5/2016 | Shaobin |
| 2017/0146688 A1* | 5/2017 | Sugiyama ............... E21B 49/10 |
| 2017/0152743 A1* | 6/2017 | Gisolf ..................... G01N 1/14 |

FOREIGN PATENT DOCUMENTS

| | | |
|---|---|---|
| GB | 2441843 | 3/2008 |
| WO | WO 2009/129289 | 10/2009 |

OTHER PUBLICATIONS

Schlumberger, "MDT Modular Formation Dynamics Tester Quality fluid samples and highly accurate reservoir pressures," Jun. 1, 2002, 11 pages.

\* cited by examiner

SUBTERRANEAN ZONE FLUID SAMPLING TOOL

TECHNICAL FIELD

This disclosure relates to operations in subterranean zones, for example, operations to sample fluids in subterranean zones through wellbores formed in the subterranean zones.

BACKGROUND

Hydrocarbons entrapped in subterranean zones can be produced through wellbores formed in the subterranean zones. A subterranean zone can include a formation, a portion of a formation or multiple formations of rocks. The subterranean zone in a hydrocarbon-carrying reservoir is studied to develop plans to produce the entrapped hydrocarbons or to manage production of hydrocarbons over time. One form of study is sampling fluids in the subterranean zone.

SUMMARY

This specification describes technologies relating to a subterranean zone fluid sampling tool.

Certain aspects of the subject matter described here can be implemented as a well tool. The tool includes an elongated tubular tool body configured to be disposed within a wellbore formed in a subterranean zone including multiple formations. The tool body includes multiple axial portions. The tool body has a length sufficient for a respective axial portion of the multiple axial portions to reside in each formation of the multiple formations. The tool includes multiple fluid sample probes configured to sample fluids in the multiple formations. The multiple fluid sample probes are radially offset from each other on a circumferential surface of the tool body. Each fluid sample probe is attached to a respective axial portion of the tool body that is configured to reside in a respective formation. The multiple fluid sample probes are configured to simultaneously sample fluids in the respective formation.

An aspect combinable with any of the other aspects can include the following features. The tool includes multiple packers attached to the tool body. The multiple packers are configured to isolate the multiple axial portions from each other.

An aspect combinable with any of the other aspects can include the following features. Each fluid sample probe includes a sample drawing portion residing within the tool body and configured to extend radially outside the tool body and contact the respective formation. The sample drawing portion is configured to draw the fluid from the respective formation. Each fluid sample probe includes a carrier residing within the tool body and carrying the sample drawing portion. The carrier is configured to extend or retract the sample drawing portion.

An aspect combinable with any of the other aspects can include the following features. The sample drawing portion is configured to be extended or retract radially from the carrier in response to a control signal.

An aspect combinable with any of the other aspects can include the following features. The well tool includes multiple flowlines fluidically coupled to the multiple fluid sample probes. The multiple flowlines reside within the tool body. Each flowline is configured to flow the sample sampled by the respective fluid sample probe.

An aspect combinable with any of the other aspects can include the following features. The well tool includes multiple pumps fluidically coupled to the multiple flowlines. The multiple pumps reside within the tool body. Each pump is configured to flow the sample through the respective flowline.

An aspect combinable with any of the other aspects can include the following features. Each pump is configured to operate at a subsurface location in the subterranean zone.

An aspect combinable with any of the other aspects can include the following features. Each pump includes a bi-directional pump.

An aspect combinable with any of the other aspects can include the following features. The well tool includes multiple fluid analyzer modules fluidically coupled to the multiple fluid sample probes. The multiple fluid analyzer modules reside within the tool body. Each fluid analyzer module is configured to analyze the sample sampled by the respective fluid sample probe.

An aspect combinable with any of the other aspects can include the following features. The multiple fluid analyzer modules are configured to operate at a subsurface location in the subterranean zone.

An aspect combinable with any of the other aspects can include the following features. Each fluid analyzer module includes a fluorescence detector.

An aspect combinable with any of the other aspects can include the following features. Each fluid analyzer is configured to determine a resistivity of the sample.

An aspect combinable with any of the other aspects can include the following features. The well tool includes multiple sampling chambers fluidically coupled to the multiple flowlines. The multiple sampling chambers reside within the tool body. Each sampling chamber is configured to receive and collect the sample sampled by the respective fluid sample probe.

An aspect combinable with any of the other aspects can include the following features. The well tool includes multiple pump out ports fluidically coupled to the multiple flowlines between the multiple fluid sample probes and the multiple sampling chambers. The multiple pump out ports reside within the tool body. Each pump out port is configured to divert a portion of the sample sampled by the respective fluid sample probe away from a respective fluid sampling chamber.

An aspect combinable with any of the other aspects can include the following features. The multiple fluid sample probes include three fluid sample probes radially offset from each other by 120° on the circumferential surface of the tool body.

Certain aspects of the subject matter described here can be implemented as a method. A well tool is positioned within a wellbore formed in a subterranean zone that includes multiple formations. The well tool carries multiple fluid sample probes at respective multiple axial portions of the well tool. Each portion is positioned in a respective formation of the multiple formations. Each fluid sample probe is configured to sample a fluid in the respective formation. The multiple fluid sample probes are simultaneously operated to sample multiple fluids from the multiple formations.

An aspect combinable with any of the other aspects can include the following features. The multiple fluid sample probes are radially offset from each other on a circumferential surface of the tool body.

An aspect combinable with any of the other aspects can include the following features. Distances between the multiple formations are determined. The well tool is assembled outside the wellbore based on the distances. The well tool is lowered into the wellbore to operate the multiple fluid sample probes to sample the multiple fluids. The well tool with the multiple fluids is raised to the surface of the wellbore to obtain the multiple fluids.

An aspect combinable with any of the other aspects can include the following features. Each fluid sample includes a sample drawing portion residing within the tool body and configured to extend radially outside the tool body and contact the respective formation. The sample drawing portion is configured to draw the fluid from the respective formation. A carrier resides within the tool body and carries the sample drawing portion. The carrier is configured to carry the sample drawing portion. To simultaneously operate the multiple fluid sample probes, each sample drawing portion is radially extended away from and outside the tool body to contact the respective formation, and, after drawing the fluid from the respective formation, radially retracted into the tool body.

Certain aspects of the subject matter described here can be implemented as a well tool system. The system includes a well tool that includes an elongated tubular body configured to be disposed within a wellbore formed in a subterranean zone that includes multiple formations. The tool body includes multiple axial portions. The tool body has a length sufficient for a respective axial portion of the multiple axial portions to reside in each formation of the multiple formations. The tool body includes multiple fluid sample probes configured to sample fluids in the multiple formations. Each fluid sample probe is attached to a respective axial portion of the tool body that is configured to reside in a respective formation. Each fluid sample probe is configured to sample a fluid in the respective formation. The system includes a controller configured to reside at a surface of the wellbore. The controller is coupled to the well tool. The controller is configured to simultaneously operate the multiple fluid sample probes to sample multiple fluids from the multiple formations.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes a subterranean zone fluid sampling tool that allows for simultaneous sampling or testing of several straddled formations. In some implementations, the tool utilizes three fluid sampling probes equipped with dedicated flowlines and sampling chambers, and includes packers to achieve required zonal isolation between the different testing or sampling points. The design of the well tool described here provides flexibility to configure and space out the well tool components based on evaluation needs prior to lowering the well tool in the wellbore. The techniques described to implement the well tool system described in this disclosure can reduce evaluation time by operating several sampling and testing setups simultaneously, thereby reducing rig time and potential wellbore-related problems such as stuck pipe. The well tool described here can be used to implement separate mini-drill stem tests (DSTs) at three different formations at the same time.

Figure 1:
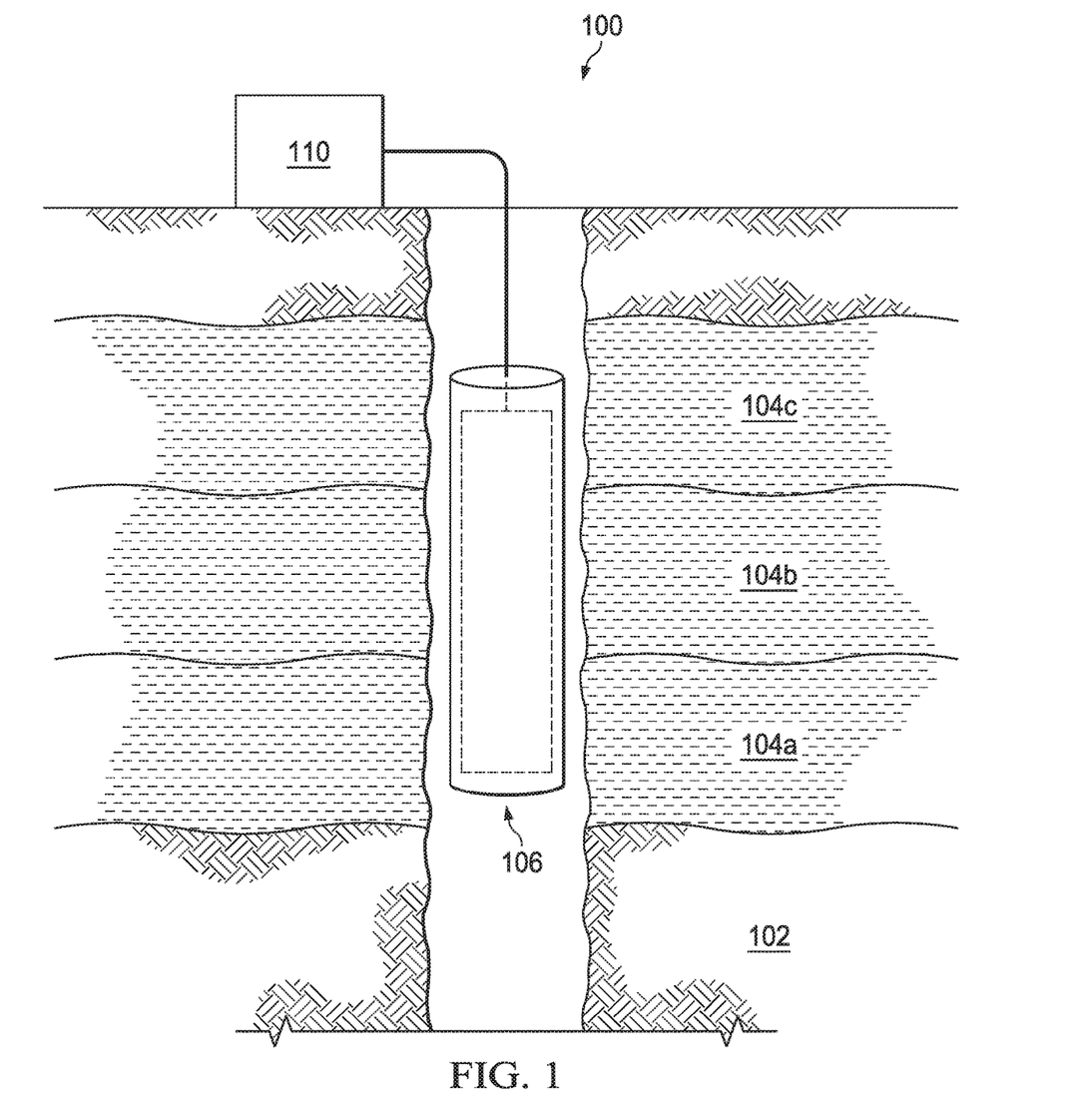
FIG. 1 is a schematic diagram of a wellbore in which a well tool system is disposed.

FIG. 1 is a schematic diagram of a wellbore 100 in which a well tool system is disposed. The wellbore 100 is formed in a subterranean zone 102 that includes multiple formations (for example, formation 104a, formation 104b, formation 104c) arranged in straddled layers. In some embodiments, a well tool system is implemented to simultaneously sample fluids, for example, oil, water, gas or similar fluids that are in the different formations at different downhole locations in the wellbore 100. The well tool system includes a well tool 106 attached to a controller 110 at a surface of the wellbore 100. In some implementations, the controller 110 includes a processor (for example, a single processor or a distributed processing system) and a computer-readable medium (for example, a non-transitory computer-readable medium) storing instructions executable by the processor to perform operations described here. In some implementations, the controller 110 includes processing circuitry, firmware, hardware, software or combinations of them, taken alone or in combination with the processor and the computer-readable medium to perform operations described here. For example, the operations can include transmitting operational signals to the components of the well tool system to perform operations, receiving response signals responsive to the operational signals from the components of the well tool system and processing the response signals to identify additional operational signals.

In some embodiments, the well tool system can be deployed to sample multiple formation fluids from multiple subsurface locations, each in a formation, and to probe well fluids at the subsurface locations. As described in detail with reference to FIGS. 2-4, in some implementations, the well tool 106 includes multiple fluid sampling probes, each of which can be operated independently to sample fluids from different formations at different depths. In some implementations, multiple fluid sampling probes are positioned within a tool body and radially offset from each other. By radially offsetting the multiple fluid sampling probes, additional space is made available within the well tool to couple additional testing equipment (described later) to each fluid sampling probe.

Figure 2:
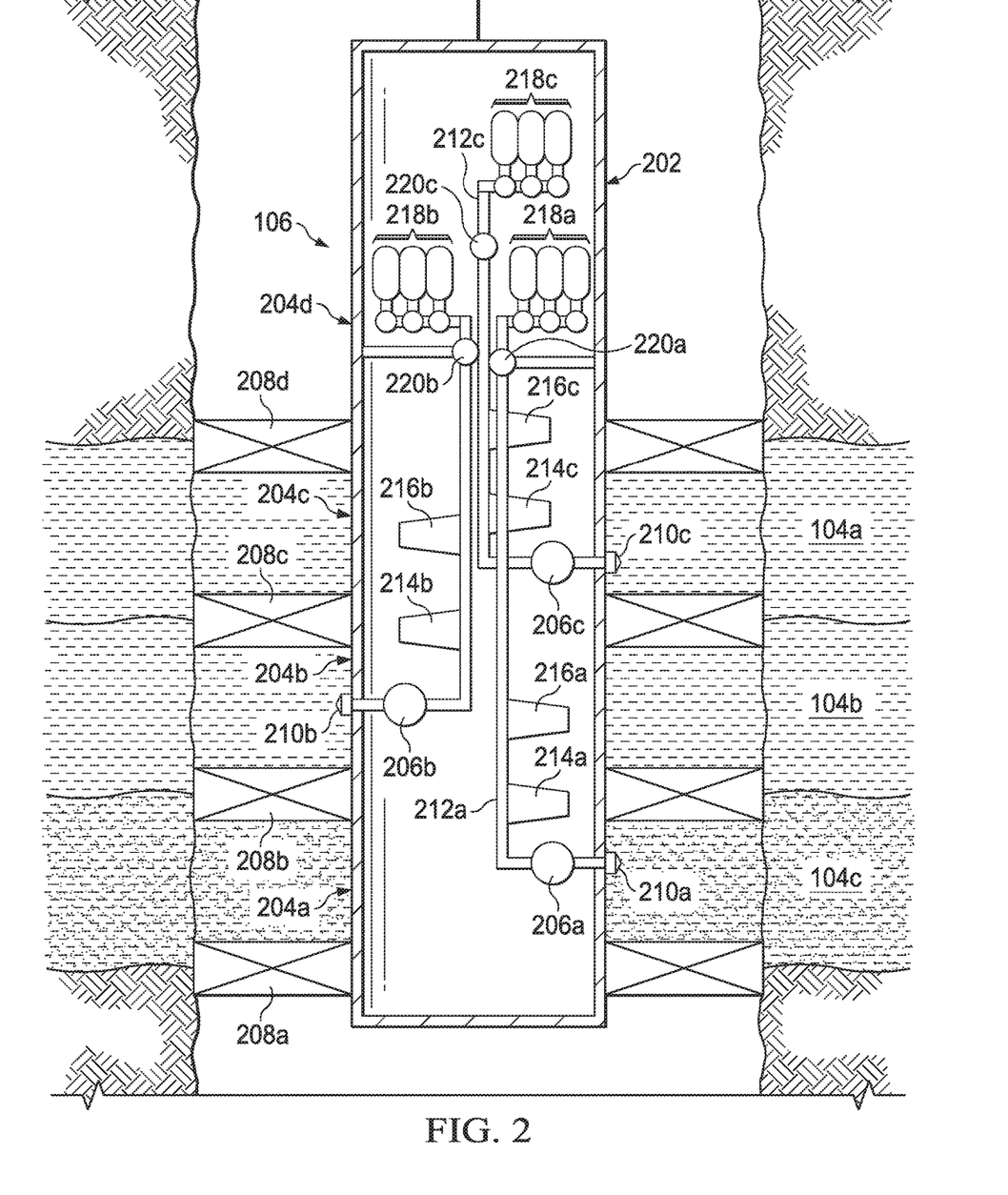
FIG. 2 is a schematic diagram of a well tool of the well tool system.

FIG. 2 is a schematic diagram of the well tool 106 of the well tool system. The well tool 106 includes an elongated tubular tool body 202 that can be disposed within a wellbore, for example, the wellbore 100. The tool body 202 includes multiple axial portions, for example, axial portion 204a, axial portion 204b, axial portion 204c, axial portion 204d. The tool body 202 has a length sufficient for a respective axial portion to reside in each formation of the multiple formations. That is, when the well tool 106 is positioned in the wellbore 100, each axial portion resides in a respective formation of the subterranean zone 102. It will be understood that a subterranean zone 102 can have more formations than those shown in FIG. 2 and that the well tool 106 need not be long enough to have an axial portion in each formation in the subterranean zone 102. Rather, the well tool 106 can be long enough to span two or more straddled layers in the subterranean zone 102 allowing the well tool 106 to simultaneously sample fluids from the multiple formations. After sampling fluids from two or three straddled layers, the well tool 106 can be moved to other straddled layers of the formation to sample fluids from the other straddled layers.

The well tool 106 includes multiple fluid sample probes (for example, probes 206a, 206b, 206c) that can sample fluids in the multiple formations. The well tool 106 schematically shown in and described with reference to FIGS. 2-4 includes three fluid sample probes. Other examples of well tools can have a different number of probes (for example, at least two or more). In some implementations, the fluid sample probes are radially offset from each other on a circumferential surface of the tool body 202. FIG. 4 is a schematic diagram of a top view of the well tool 106. The view shows the probes 206a, 206b and 206c radially offset from each other on the circumferential surface 402 of the tool body 202. In some implementations, the probes are offset evenly on the circumferential surface 402. For example, three probes can be offset by 120° (that is, 360°/number of probes). In some implementations, the offset can be uneven. For example, two probes can be positioned on the tool body 202 nearer to each other while a third probe is positioned on the tool body 202 farther away from the two probes. Unevenly offsetting the probes can vary the space available to the probes to connect additional equipment. For example, if fluid samples from a first formation need to be collected or tested differently compared to fluid samples for other, straddled formations, then additional equipment may need to be connected to the probe in the first formation. In such an instance, the probes can be unevenly offset to create additional space within the tool body 202 to run the additional equipment.

In some implementations, each probe is attached to a respective axial portion of the tool body that can reside in a respective formation when the well tool 106 is lowered into the wellbore 100. For example, probes 206a, 206b and 206c are attached to axial portions 204a, 204b and 206c, respectively, that reside in formations 104a, 104b and 104c, respectively. In this manner, each fluid sampling probe resides in a respective formation of the subterranean zone 102 allowing each fluid sample probe to sample fluids from the respective formation in which the probe resides.

In some implementations, the well tool 106 includes multiple packers (for example, packers 208a, 208b, 208c, 208d) configured to isolate the multiple axial portions from each other. The packers, for example, inflatable packers, ensure isolation between the probes in the straddled layers and allows each probe to sample fluids that is representative of the formation in which the probe resides. Each packer includes features that can be inflated or deflated one or more times at different depths as needed.

In some implementations, each fluid sample probe (for example, the probe 206a) can include a sample drawing portion 210a and a carrier 210b. The sample drawing portion 210a, in one state, resides within the tool body 202 (that is, within an internal volume defined by the circumferential surface 402 (FIG. 4) of the tool body 202), and, in another state, can extend radially outside the tool body 202 and contact the respective formation (formation 104c in FIG. 2). The sample drawing portion 210a can draw the fluid samples from the formation 104c in which the probe 206a resides. In some implementations, the sample drawing portion 210a can include a hollow tube or pipe with an inlet through which fluid samples can be received from the formation 104c. In some implementations, the flow of fluid samples into the sample drawing portion 210a can be controlled, for example, by a valve, positioned at the inlet. The carrier 210b resides within the tool body 202 and carries the sample drawing portion 210a. The carrier 210b can extend or retract the sample drawing portion 210a radially away from or toward the tool body 202, for example, hydraulically and in response to a control signal. When retracted, the sample drawing portion 210a is in the state in which it resides within the tool body 202, and, when extended, the sample drawing portion 210b is in the state in which it is radially extended outside the tool body 202. Simultaneous operation of the multiple fluid sample probes 206a, b, c can be implemented by simultaneous extension followed by retraction of the multiple sample drawing portions 210a, b, c. Alternatively, each sample drawing portion can be extended separately and the sample fluid drawing can be implemented simultaneously. Each sample drawing can similarly be retracted separately followed by the simultaneous sample fluid drawing.

In some implementations, the well tool 106 includes multiple flowlines (for example, flowlines 212a, 212b, 212c) fluidically coupled to respective fluid sample probes. The multiple flowlines reside within the tool body 202. That is, each flowline is dimensioned to fit entirely within the internal volume defined by the circumferential surface 402 of the tool body 202. Each flowline can flow the fluid samples sampled by the respective fluid sample probe. For example, an outlet of the probe 206a can be fluidically coupled to an inlet of the flowline 212a such that fluid samples drawn from the formation 104a by the probe 206a is passed to the flowline 212a.

In some implementations, the well tool 106 can include multiple pumps (for example, pumps 214a, 214b, 214c) fluidically coupled to respective flowlines. The multiple pumps reside within the tool body 202. That is, each pump is dimensioned to fit entirely within the internal volume defined by the circumferential surface 402 of the tool body 402. Each pump can be a bi-directional pump or other type of pump configured to operate at a respective subsurface location under wellbore conditions (for example, elevated temperature, pressure). Also, each pump is rated to pump fluid samples through each flowline from an inlet of the flowline that is fluidically coupled to the outlet of the sampling probe to an outlet of the flowline.

In some implementations, the well tool 106 can include multiple fluid analyzer modules (for example, fluid analyzer modules 216a, 216b, 216c) fluidically coupled to respective flowlines. The multiple fluid analyzer modules reside within the tool body 202. That is, each fluid analyzer module is dimensioned to fit entirely within the internal volume defined by the circumferential surface 402 of the tool body 202. Each fluid analyzer module is configured to analyze the fluid samples sampled by the respective fluid sample probe while disposed at a respective subsurface location under wellbore conditions (for example, elevated temperature, pressure) For example, the fluid analyzer module 216a can include a light source that is configured to illuminate the fluid samples flowing through the flowline 212a to induce fluorescence, responsively measure a quantity of the induced fluorescence, and either transmit or store (or both) the quantity of induced fluorescence. In another example, the fluid analyzer module 216b can be configured to measure a resistivity of the sample flowing through the flowline 212b and either transmit or store (or both the measured resistivity.

In a further example, the fluid analyzer module 216c can be configured to implement optical techniques to analyze the fluid samples flowing through the flowline 212c. An example implementation of a fluid analyzer module is described with reference to FIGS. 6A-6C.

In some implementations, the well tool 106 can include multiple sampling chambers (for example, sampling chambers 218a, 218b, 218c) fluidically coupled to respective flowlines. The multiple sampling chambers reside within the tool body 202. That is, each sampling chamber is dimensioned to fit entirely within the internal volume defined by the circumferential surface 402 of the tool body 202. Each sampling chamber is configured to receive and collect the fluid samples sampled by a respective fluid sample probe. For example, the sampling chambers 218a are fluidically coupled to an outlet of the flowline 212a. Fluid samples drawn by the probe 206a flows through the flowline 212a to the sampling chambers 218a. The sampling chambers 218a receive, collect and store the sample. In some implementations, the entirety of the fluid samples can be collected and stored in one sampling chamber. In some implementations, the fluid samples can be distributed across multiple sampling chambers. In some implementations, a valve assembly can be implemented between the flowline and the sampling chambers to prevent collected fluid samples from exiting the sampling chamber.

In some implementations, the well tool 106 can include multiple pump out ports (for example, pump out ports 220a, 220b, 220c) fluidically coupled to respective flowlines between respective probes and respective sampling chambers. Each pump out port can include a valve (for example, a 3-way valve) that is configured to divert a portion of the fluid samples sampled by the respective probe away from the respective sampling chamber. For example, fluid samples initially drawn by the probe 206a can include impurities or contaminants. The pump out port 220a can divert an initial volume of the fluid samples sampled by the probe 206a away from the sampling chambers 218a, for example, back into the wellbore 100. When the well tool 106 is assembled, each pump out port is in a state that diverts fluid flowing through the flowline away from the sampling chamber. After an initial volume has been diverted away from the sampling chamber, the state of the pump out port is changed to flow fluid samples toward the sampling chamber. For example, in response to the fluid analyzer module determining that the fluid is suitable for collection in the sampling chamber, the state of the pump out port is changed to flow the fluid samples toward the sampling chamber. In some implementations, filters (for example, wire meshes or screen filters) can be disposed before the inlet to the sampling chambers to filter any solid particulates from flowing into the sampling chambers.

Figure 3:
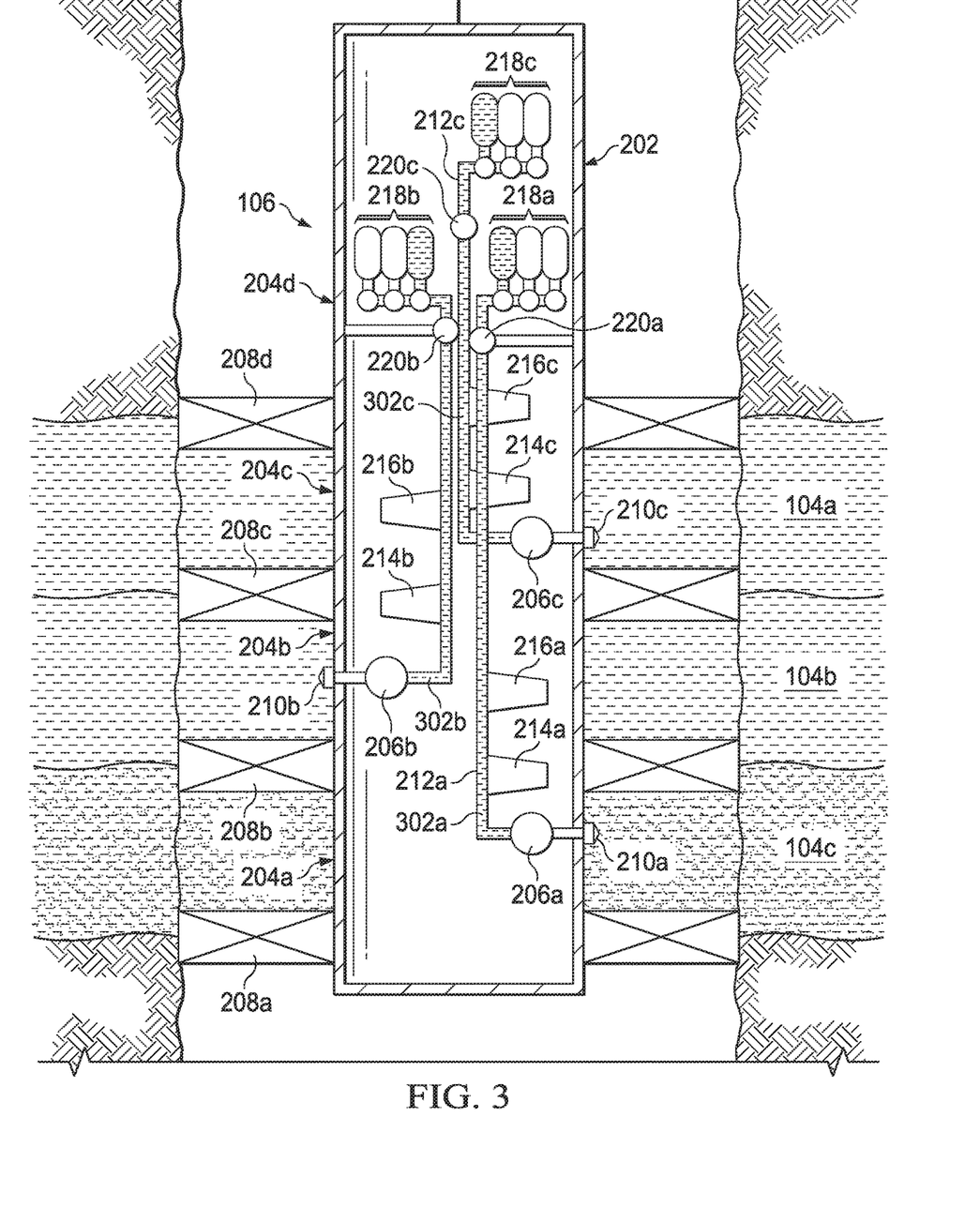
FIG. 3 is a schematic diagram showing an operation of the well tool.
Figure 4:
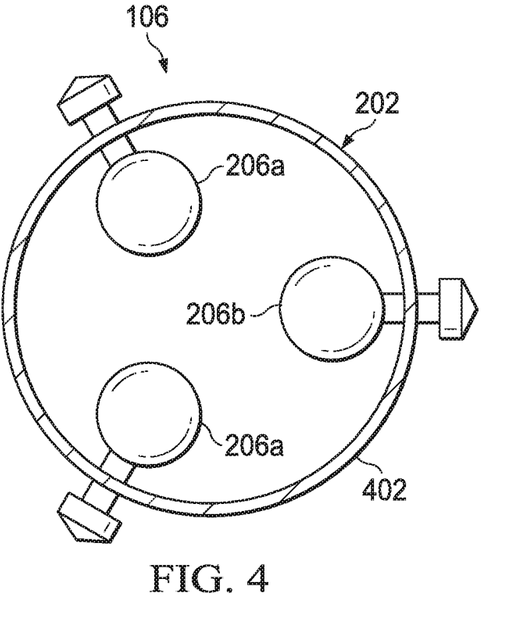
FIG. 4 is a schematic diagram of a top view of the well tool.
Figure 5:
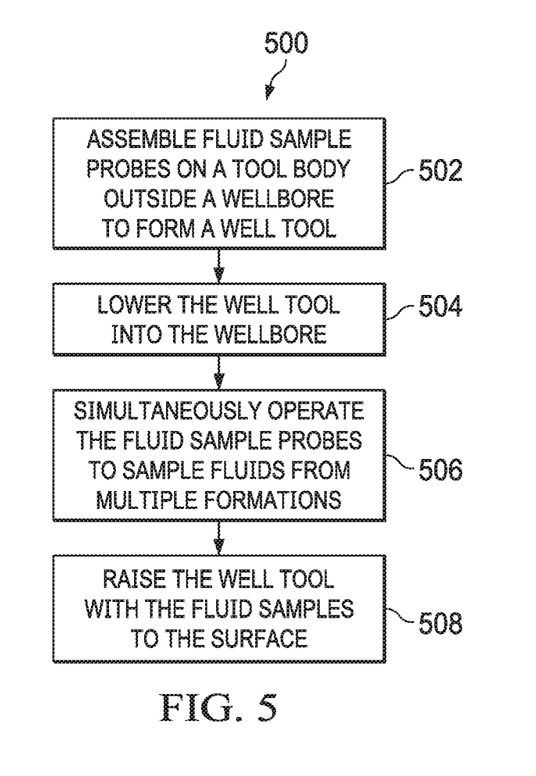
FIG. 5 is a flowchart of an example of a process of operating the well tool system.

FIG. 3 is a schematic diagram showing an operation of the well tool. FIG. 5 is a flowchart of an example of a process 500 of operating the well tool system. Certain aspects of the process 500 can be implemented manually (for example, a well tool operator) using wellbore operations equipment. For example, the well tool operator can manually input instructions to the controller 110 to perform certain steps of the process 500. At 502, fluid sample probes are assembled on a tool body outside a wellbore to form a well tool. For example, the components of the well tool 106 described earlier can be selected and attached to the tool body 202 as described above. At 504, the well tool is lowered into the wellbore. For example, the well tool is attached to a string, for example, a drill string, and lowered into the wellbore. In some implementations, the well tool can be lowered into the wellbore by a wireline, for example, conveyed on drill string, or other mechanisms that can lower the well tool into the wellbore and transmit power and data signals to the well tool. Upon reaching the desired depth in the wellbore, the packers can be inflated to zonally isolate the different axial portions of the well tool that reside in respective formations of the subterranean zone. For example, instructions from the controller 110 can inflate the packers. At 506, the probes in the well tool are simultaneously operated to sample fluids from multiple formations. For example, instructions from the controller 110 disposed at the surface of the wellbore can be transmitted to the well tool 106 causing each sample probe to draw fluid simultaneously and independently of each other. The fluid samples collected in the sampling chambers reside within the well tool 106. At 508, the well tool carrying the fluid samples is raised to the surface. For example, instructions from the controller 110 can cause the packers to be deflated and the well tool to be raised to the surface. At the surface, the fluid samples can be removed from the sampling chambers and tested. In some implementations, fluid analyses data stored by the fluid analyzer modules can be retrieved from the modules at the surface, and the data used to determine information about the fluid samples.

Figure 6A:
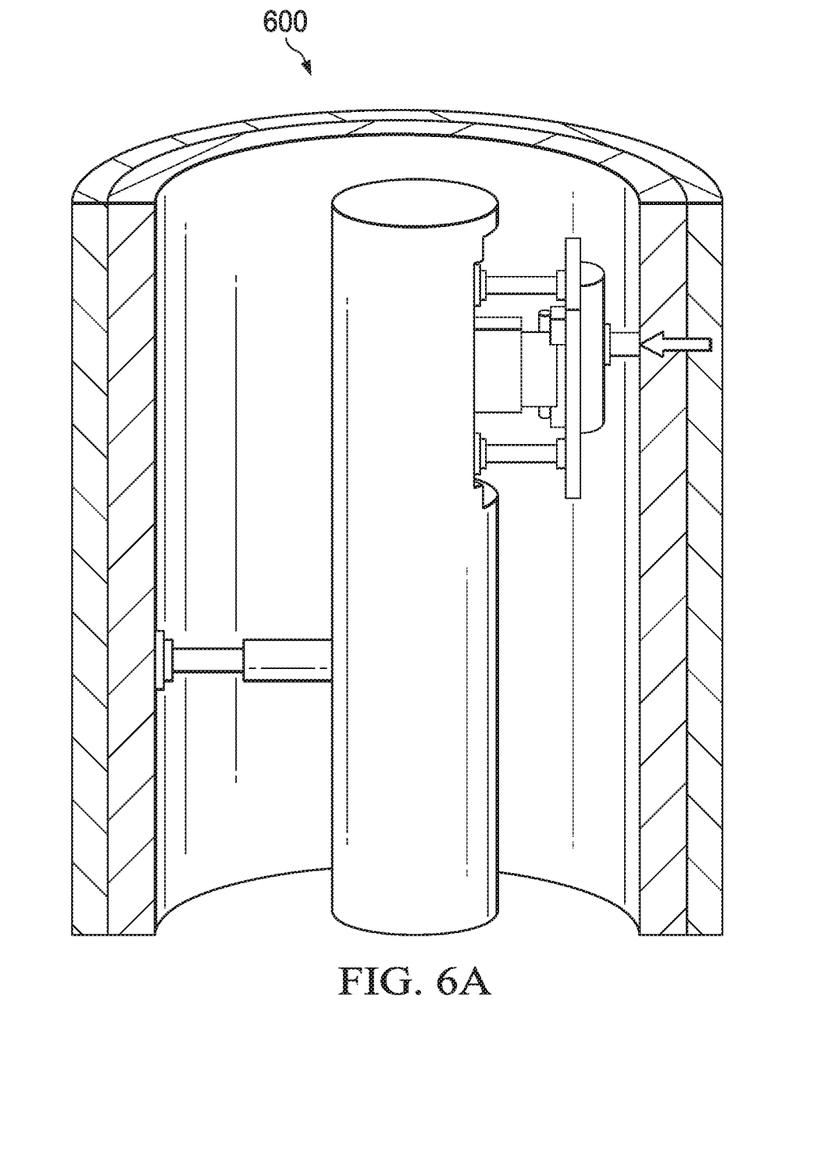
FIG. 6A is a schematic diagram of a fluid analyzer module.
Figure 6B:
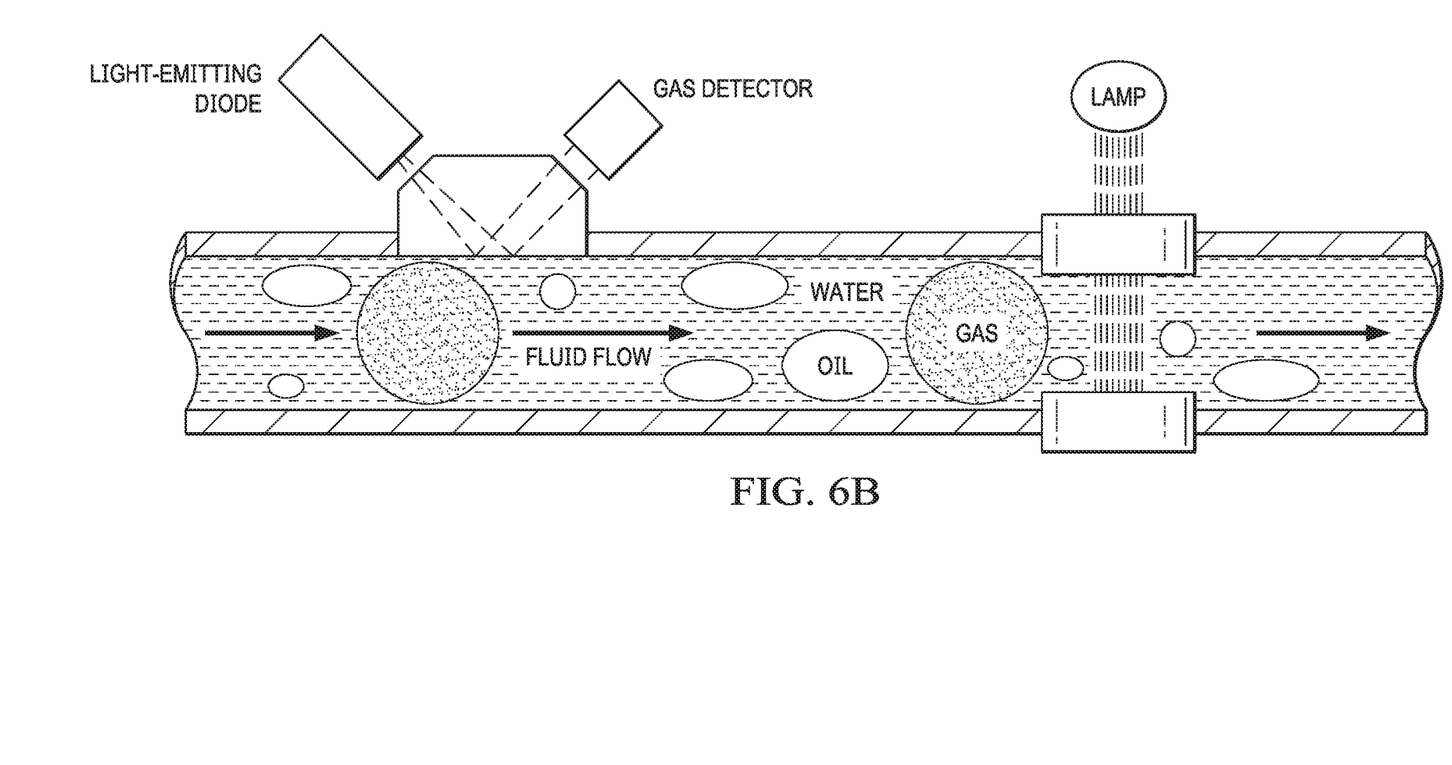
FIG. 6B is a schematic diagram showing an operational principle of the fluid analyzer module of FIG. 6A.
Figure 6C:
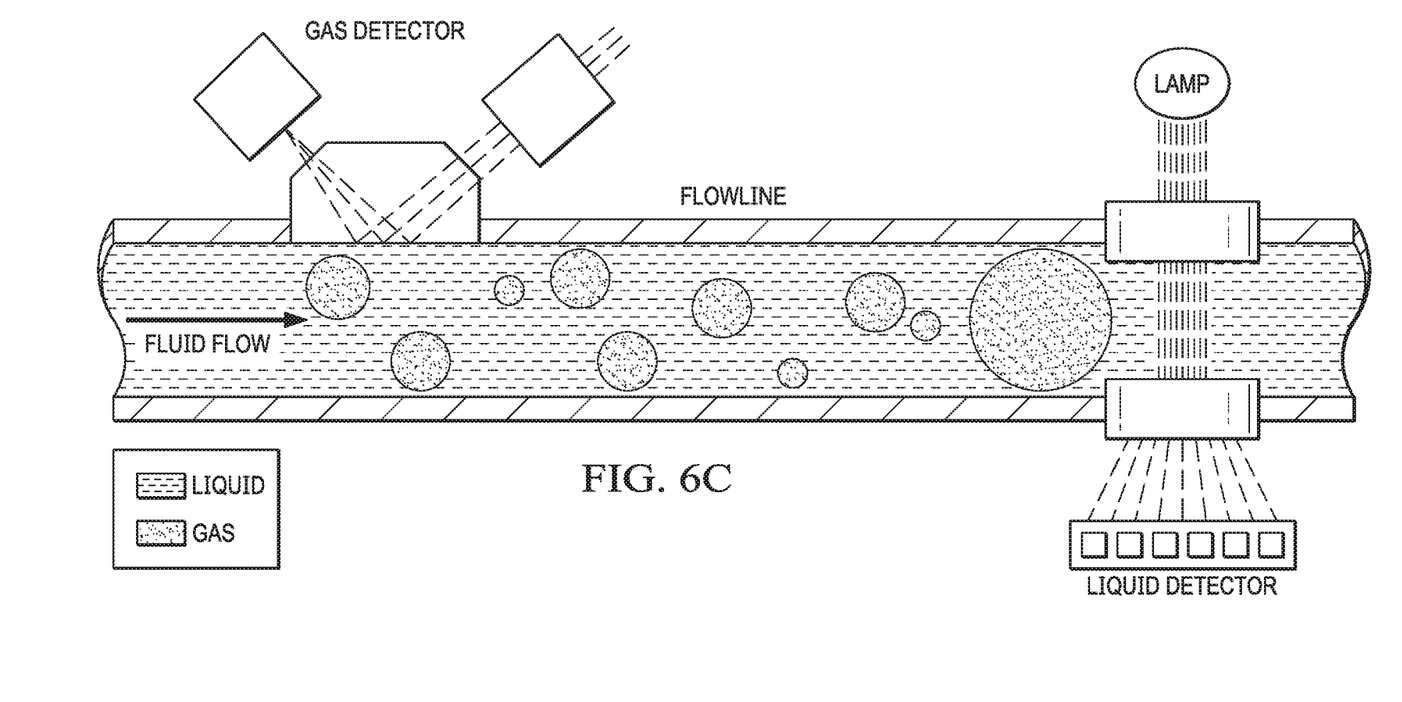
FIG. 6C is a schematic diagram showing an operational principle of the fluid analyzer module of FIG. 6A.

FIG. 6A is a schematic diagram of a fluid analyzer module 600. FIG. 6B is a schematic diagram showing an operational principle of the fluid analyzer module 600. FIG. 6C is a schematic diagram showing an operational principle of the fluid analyzer module 600. The sample fluid that flows through the fluid analyzer module 600 includes different hydrocarbon components, for example, oil, water, gas. A module includes a light source (for example, a LED) that illuminates the sample fluid. The light from the light source induces fluorescence response in the components of the sample fluid. The quantity of fluorescence induced by the light varies depending on the component. The module includes a fluorescence detector that can detect the quantity of fluorescence. In some implementations, the module can identify the component based on the detected quantity and transmit a signal indicative of the component to the controller 110. In some implementations, the module can transmit the quantity of the fluorescence to the controller 110 which can identify the component. In some implementations, the module 600 can include a light source that can illuminate a cross-section of a sampling tube through which the sample fluid flows. The light can be received by a detector positioned diametrically opposite the light source. As the sample fluid flows through the cross-section, the components absorb a portion of the light and transmit a remainder to the detector. The quantity of light detected by the detector can be used to identify the component in the sample fluid. In some implementations, the module can identify the component based on the quantity of detected light and transmit a signal indicative of the component to the controller 110. In some implementations, the module can transmit the quantity of detected light to the controller 110 which can identify the component. In some implementations, the module can include a resistivity measurement device that can measure the resistivity of the sample fluid. The module can identify different components of the sample fluid based on the different resistivities of the respective components in the sample fluid.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

The invention claimed is:

1. A well tool comprising: an elongated tubular tool body configured to be disposed within a wellbore formed in a subterranean zone comprising a plurality of formations, the tool body comprising a plurality of axial portions, the tool body having a length sufficient for a respective axial portion of the plurality of axial portions to reside in each formation of the plurality of formations; and a plurality of fluid sample probes configured to sample fluids in the plurality of formations, the plurality of fluid sample probes radially offset from each other on a circumferential surface of the tool body, each fluid sample probe attached to a respective axial portion of the tool body that is configured to reside in a respective formation, the plurality of fluid sample probes configured to simultaneously sample respective fluids in the respective formation, wherein each fluid sample probe comprises: a sample drawing portion residing within the tool body and configured to extend radially outside the tool body and contact the respective formation, the sample drawing portion configured to draw the fluid from the respective formation; and a carrier residing within the tool body and carrying the sample drawing portion, the carrier configured to extend or retract the sample drawing portion.

2. The well tool of claim 1, wherein the sample drawing portion is configured to be extended or retract radially from the carrier in response to a control signal.

3. The well tool of claim 1, further comprising a plurality of flowlines fluidically coupled to the plurality of fluid sample probes, the plurality of flowlines residing within the tool body, each flowline configured to flow the sample sampled by the respective fluid sample probe.

4. The well tool of claim 3, further comprising a plurality pumps fluidically coupled to the plurality of flowlines, the plurality of pumps residing within the tool body, each pump configured to flow the sample through the respective flowline.

5. The well tool of claim 4, wherein each pump is configured to operate at a subsurface location in the subterranean zone.

6. The well tool of claim 4, wherein each pump comprises a bi-directional pump.

7. The well tool of claim 3, further comprising a plurality of fluid analyzer modules fluidically coupled to the plurality of fluid sample probes, the plurality of fluid analyzer modules residing within the tool body, each fluid analyzer module configured to analyze the sample sampled by the respective fluid sample probe.

8. The well tool of claim 7, wherein the plurality of fluid analyzer modules are configured to operate at a subsurface location in the subterranean zone.

9. The well tool of claim 7, wherein each fluid analyzer module comprises a fluorescence detector.

10. The well tool of claim 7, wherein each fluid analyzer is configured to determine a resistivity of the sample.

11. The well tool of claim 3, further comprising a plurality of sampling chambers fluidically coupled to the plurality of flowlines, the plurality of sampling chambers residing within the tool body, each sampling chamber configured to receive and collect the sample sampled by the respective fluid sample probe.

12. The well tool of claim 11, further comprising a plurality of pump out ports fluidically coupled to the plurality of flowlines between the plurality of fluid sample probes and the plurality of sampling chambers, the plurality of pump out ports residing within the tool body, each pump out port configured to divert a portion of the sample sampled by the respective fluid sample probe away from a respective fluid sampling chamber.

13. A method comprising: positioning a well tool within a wellbore formed in a subterranean zone comprising a plurality of formations, the well tool carrying a plurality of fluid sample probes at a respective plurality of axial portions of the well tool, each portion positioned in a respective formation of the plurality of formations, each fluid sample probe configured to sample a fluid in the respective formation; and simultaneously operating the plurality of fluid sample probes to sample a plurality of fluids from the plurality of formations, wherein each fluid sample probe comprises: a sample drawing portion residing within the tool body and configured to extend radially outside the tool body and contact the respective formation, the sample drawing portion configured to draw the fluid from the respective formation; and a carrier residing within the tool body and carrying the sample drawing portion, the carrier configured to carry the sample drawing portion, wherein simultaneously operating the plurality of fluid sample probes comprises: radially extending each sample drawing portion away from and outside the tool body to contact the respective formation, and after drawing the fluid from the respective formation, radially retracting each sample drawing portion into the tool body.

* * * * *